(12) United States Patent
Scheufele et al.

(10) Patent No.: US 6,676,552 B2
(45) Date of Patent: Jan. 13, 2004

(54) PLATE-LINK CHAIN

(75) Inventors: Klaus Scheufele, Fort Louis (FR); Werner Gruca, Memprectshofen (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 09/999,176

(22) Filed: Nov. 30, 2001

(65) Prior Publication Data

US 2002/0091027 A1 Jul. 11, 2002

(30) Foreign Application Priority Data

Nov. 30, 2000 (DE) .......................... 100 59 380

(51) Int. Cl.⁷ .......................... F16G 13/04; F16G 13/06; B21L 9/02
(52) U.S. Cl. .............................. 474/215; 474/229; 59/4
(58) Field of Search ................................ 474/212, 215, 474/213, 217, 229, 214, 216, 206, 211; 59/4, 5, 78.1, 78

(56) References Cited

U.S. PATENT DOCUMENTS

| | | | | | |
|---|---|---|---|---|---|
| 2,047,833 A | * | 7/1936 | Pierce | ........................ | 474/217 |
| 2,067,243 A | * | 1/1937 | Perry | ........................ | 474/215 |
| 2,096,061 A | * | 10/1937 | Perry | ........................ | 474/215 |
| 4,764,158 A | * | 8/1988 | Honda et al. | ................ | 474/212 |
| 5,009,631 A | * | 4/1991 | Ivey et al. | ................... | 474/213 |
| 5,651,746 A | * | 7/1997 | Okuda | ........................ | 474/215 |
| 6,135,908 A | | 10/2000 | Greiter | ........................ | 474/215 |
| 6,142,903 A | * | 11/2000 | Heinrich | ...................... | 474/215 |
| 6,260,345 B1 | * | 7/2001 | Kanehira et al. | ................ | 59/4 |
| 6,432,011 B1 | * | 8/2002 | Kanehira et al. | ........... | 474/215 |

FOREIGN PATENT DOCUMENTS

| | | |
|---|---|---|
| DE | 30 27 834 C2 | 2/1982 |
| DE | 197 08 865 A1 | 3/1997 |
| EP | 0 518 478 B2 | 2/1999 |
| EP | 0 741 255 B2 | 5/2000 |

* cited by examiner

Primary Examiner—Marcus Charles
(74) Attorney, Agent, or Firm—Alfred J. Mangels

(57) ABSTRACT

A drive chain suitable for use in a continuously variable transmission of a motor vehicle. The transmission has two pairs of spaced drive members about which the chain passes to transfer torque from one drive member to the other. The chain includes a plurality of link elements that include spaced, side-by-side plate links. The plate links include openings in which pairs of parallel rocker members are disposed for relative rocking movement of at least one rocker member about its longitudinal axis. The rocker members extend outwardly beyond the plate links and are retained in position by retaining members that engage particular rocker members. A method for stretching the chain is also disclosed in which areas of some of the plate links are plastically deformed before the chain is put to use.

13 Claims, 8 Drawing Sheets

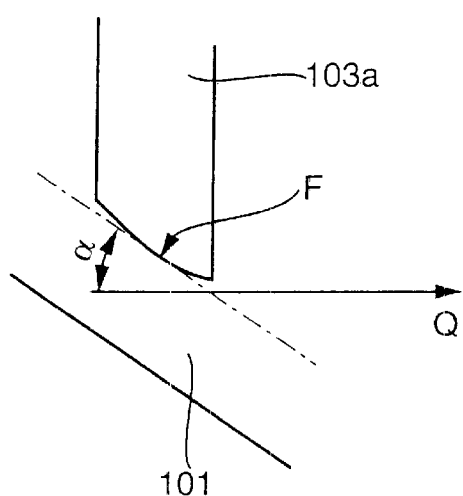
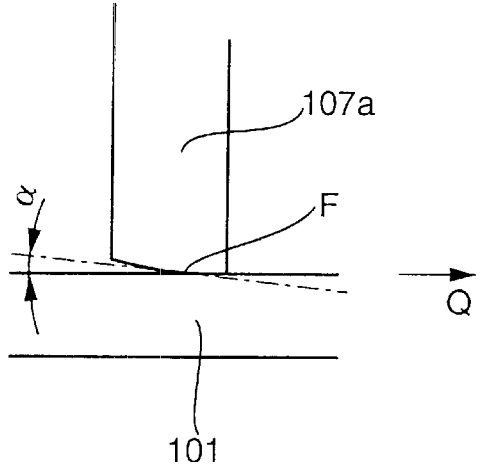
Fig. 9a  Fig. 9b
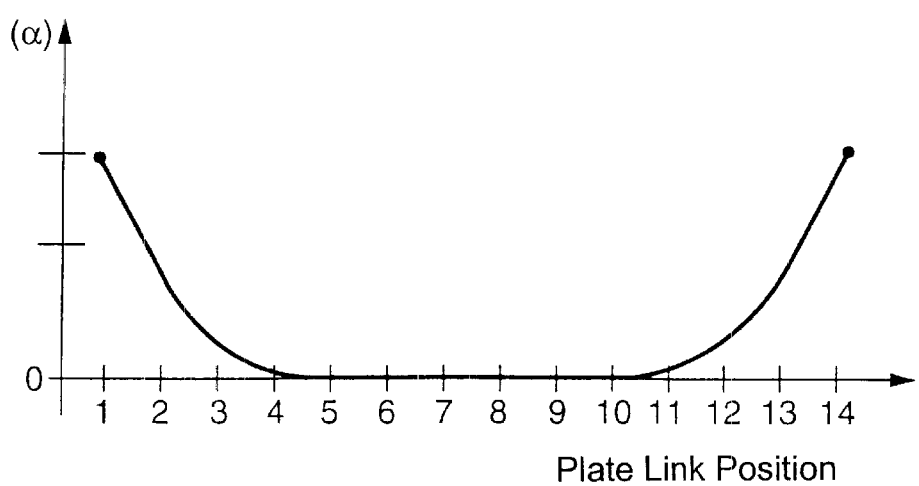
Fig. 10

PLATE-LINK CHAIN

BACKGROUND OF THE INVENTION

1. Field of the Invention

The invention relates to a plate-link chain, especially for use in a continuously variable, conical disk transmission, such as a CVT transmission. The individual link elements of the chain are formed by link sets constituted by connected chain links, preferably as pairs, which include rocker members inserted into openings in the plate links and having rocker faces supported against each other. The invention also relates to a method for producing that type of chain.

2. Description of the Related Art

Plate-link chains of that type are known in the art. Examples are disclosed in German Patent Publication DE 197 08 865 and in the publications cited therein, EP 0 518478, and EP 0 741 255.

In order to increase the load bearing capacity of plate-link chains of the designated kind, following assembly of the plate links and the rocker members into a straight, open length of chain, the elongated plate-link chain is subjected to a stretching process by applying to it a substantial tensile force. In that manner, contact areas of the plate links, between the plate links and the rocker members, of all the plate links in a row are equally plastically deformed. Stretching a straight chain results in an equal plastic deformation of the plate links in the contact surface areas, so that the plate links of a row of plate links are equally lengthened or have the same inner width. That has the disadvantage that if the plate-link chain is loaded during operation of the continuously variable transmission, the life span and performance of the chains are not optimized.

A purpose of the invention is to provide a plate-link chain, and a method for producing a plate-link chain that can withstand a higher load than state-of-the-art plate-link chains, or that has a longer life span at the same operating load.

SUMMARY OF THE INVENTION

According to the invention, that objective is achieved in the above-mentioned plate-link chains by stretching the plate-link chain when in the closed condition.

The objective according to the invention is also achieved in that, with regard to a plate-link chain as mentioned above, the plate links have varying inner widths that vary as a function of the width of the chain. In accordance with the invention, that can be achieved by stretching the plate-link chain while it is in a loop in a closed condition.

The notion of plate inner width corresponds with the distance between the contours at which the two outer rocker members contact the plate link. Therefore, that is a distance that is independent of whether the plate link has one central opening or two openings for receiving the rocker members. That is further presented in the drawing figure descriptions.

In another exemplary embodiment, however, it is advantageous if the plate links are manufactured with different plate link inner widths, by a manufacturing process such as a stamping process or a cutting process, for example by means of a laser or the like, and the individual plate links are then stretched equally or differently and assembled with each another, or the assembled chain is stretched while in a loop.

Additionally, in a further exemplary embodiment, it is appropriate for the plate links with the same plate link inner widths to be produced by a stamping process, and to be varyingly stretched and assembled with one another. In this exemplary embodiment the stretching process can also be performed on the individual plate links before assembly, or on the assembled chain when it is in a loop.

According to another object of the invention, the inventive solution can also be achieved with regard to an above-identified plate-link chain if the plate links have different degrees of stretch, as a function of the width of the chain.

That can advantageously be achieved in that the plate links having equal or different plate link inner widths are stretched at different degrees and assembled with each another. That can also be achieved by stretching when the chain is in a loop In accordance with another inventive concept, the purpose can also be achieved in a plate-link chain as discussed above in which the plate links, as a function of the width of the chain, have a different angle between the contact areas and an axis that is transverse to the longitudinal direction of the chain. A modulation or variation of the angle is thereby achieved across the width of the chain that allows a relatively good fit or arrangement of the plate links to the rocker members that become partially bent during the operation of the chain.

In accordance with another inventive concept, the purpose can also be achieved in a plate-link chain as discussed above if a stretching load is applied to the plate links during the stretching process at an angle that varies relative to the longitudinal direction of the plate links. The plate links will thereby be stretched at different positions of their contact areas with the rocker members, and in that way the plate links will be strengthened so that when loaded during the operation of the chain they will exhibit sufficient strength both as a straight length between pairs of conical disks as well as in the area of the pairs of conical disks.

It is especially advantageous if the plate links are stretched individually and subsequently assembled with one another. In another exemplary embodiment it is useful if the plate links are stretched when in an assembled state as a closed chain, in particular in a loop arranged between two conical disk pairs of a device.

The invention advantageously relates to plate-link chains in which at least one of the end faces of the rocker members per link, associated with a respective conical disk, transfers the frictional forces between the conical disks and the plate-link chain. Thus, depending on the specific application of the exemplary embodiment, it can be useful for the rocker members either to be equally long or to have different lengths.

But the invention also advantageously relates to plate-link chains that, in addition to the rocker members, have cross pins that transfer the frictional forces between the conical disks and the plate-link chain.

It is especially advantageous if adjacent plate links that are positioned along the edge of the plate-link chain are elongated considerably more than the plate links that are in the center of the plate-link chain, or if adjacent plate links that are positioned along the edge of the plate-link chain have a larger plate-link inner width than the plate links that are in the center of the plate-link chain.

Furthermore, it is useful if during a stretching process areas of the plate links that contact the rocker members are plastically deformed, so that an angle is formed between the contact areas and a direction that extends transversely to the longitudinal direction of the chain.

It is useful if during a stretching process the plastic deformation of the contact areas of the plate links that are positioned along the edge of the plate-link chain is greater than that of the plate links that are positioned in the center of the plate-link chain. It is also useful if the plastic deformation of the contact areas of the plate links, viewed over the entire width of the chain, has a curved shape or the shape of a polynomial of the $n^{th}$ degree.

It is especially advantageous if during the stretching process the plate-link chain is received within the gaps between two pairs of conical disks and rotational speed and/or torque is applied to it.

It is also useful for the stress on the plate-link chain during the stretching process to be provided by an axial load by pressing together the conical disks and/or by pulling apart the shafts of the pairs of conical disks. Correspondingly, the invention also relates to a device for stretching a plate-link chain. It is useful in that context if the conical disks of the pairs of conical disks are movable relative to one another or are fixed.

When stretching the plate-link chain, it is useful if the torque that can be applied during the stretching process is considerably greater than the nominal torque during the operation of a transmission that is provided with the plate-link chain.

It is also useful if the torque that can be applied during the stretching process is between zero and ten times, preferably three to five times, the nominal torque during normal operation of a transmission that is provided with a plate-link chain.

It is also useful if the tension in the strand of the chain during the stretching process is greater than the nominal tension during normal operation of a transmission that is provided with a plate-link chain.

The present invention also relates to a method for producing a plate-link chain, especially in accordance with one of the above-identified techniques. Additionally, the present invention relates to a method for stretching a plate-link chain.

BRIEF DESCRIPTION OF THE DRAWINGS

Further characteristics and details that are specific to the invention can be derived from the following description of embodiments that are shown in the drawings, in which:

FIG. 9a is a cutaway portion of FIG. 9;

FIG. 9b is a cutaway portion of FIG. 9;

FIG. 10 is a graph of contact area angle as a function of width-wise position of the plate links;

DESCRIPTION OF THE PREFERRED EMBODIMENTS

Figure 1:
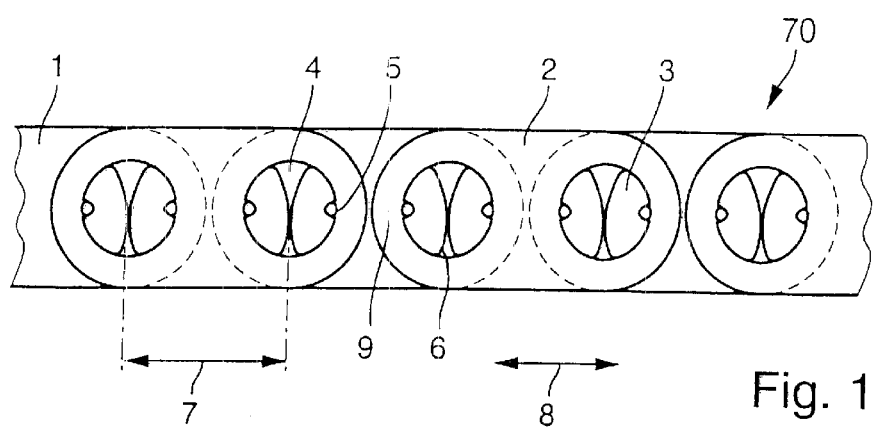
FIG. 1 is a side view of a known plate-link chain with a double plate-link connection.
Figure 3:
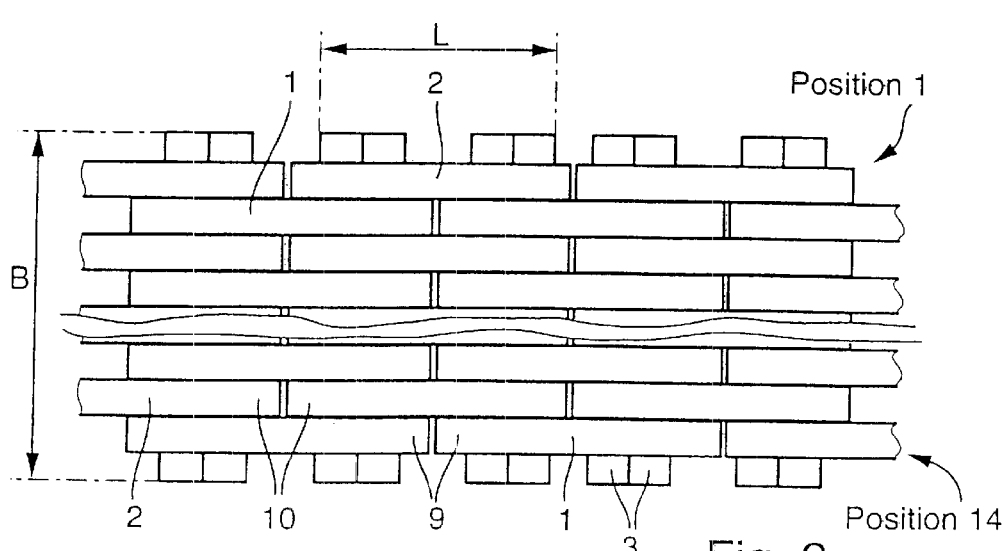
FIG. 3 is a top view of the plate-link chain shown in FIG. 1.

FIGS. 1 and 3 show a side view and a top view of a portion of a known plate-link chain with standard plate links 1 and 2, wherein the plate links as viewed are arranged over the width B of the plate-link chain and repeat themselves in an appropriate arrangement pattern. The plate links form link sets in series. The chain links formed by the plate links 1 and 2 are articulated by articulation members that are connected with each other, which are composed of pairs of rocker members 3, which are inserted into openings 4 in the plate links and are rotatably coupled and connected by an interlocking connection 5 with the particular associated plate links. The openings 4 can be formed in such a way that there are two openings formed per plate link for both links, or also that per plate only one opening is provided to receive rocker members for both links. The rocker members 3 have rocker faces 6 that are directed toward each other and that can roll against each other, at least some convex, for example, which permits the link movement of adjacent chain links. The rocker faces can both be convex or one rocker face can be flat or concave and the other rocker face is convex.

Such plate-link chains can be formed in such a way that at least some rocker members are at least partially non-rotatably connected with their plate links associated with their chain links.

The individual links have a center-to-center spacing 7 that in general is designated the chain pitch. The magnitude of the chain pitch 7 depends on the given extent of the rocker members 3 in the direction of movement 8 of the chain, as well as on the necessary spacing between the individual openings 4. It is generally known that the chain pitch 7 is designed to remain unchanged over the full chain length; it can, however, also vary irregularly within given limits if necessary, in order to favorably influence the noise developed by the chain.

The rocker members have end faces at their side end areas with which they can frictionally engage the conical disks during operation of a transmission. It is advantageous for both rocker members to have the same length, so that both rocker members are in contacting engagement with the conical disk. In another embodiment it is appropriate to provide rocker members having different lengths and thereby only one rocker member per link is in frictional contact with the conical disk.

It can be seen from the top view of FIG. 3 that the chain is assembled as a double-link unit, which means that in each case two radial end links 9, 10, respectively, of adjacent chain links are positioned adjacent to each other between two pairs of rocker members 3, whereby the spacing of those links formed by pairs of rocker members is correspondingly determined.

Figure 4:
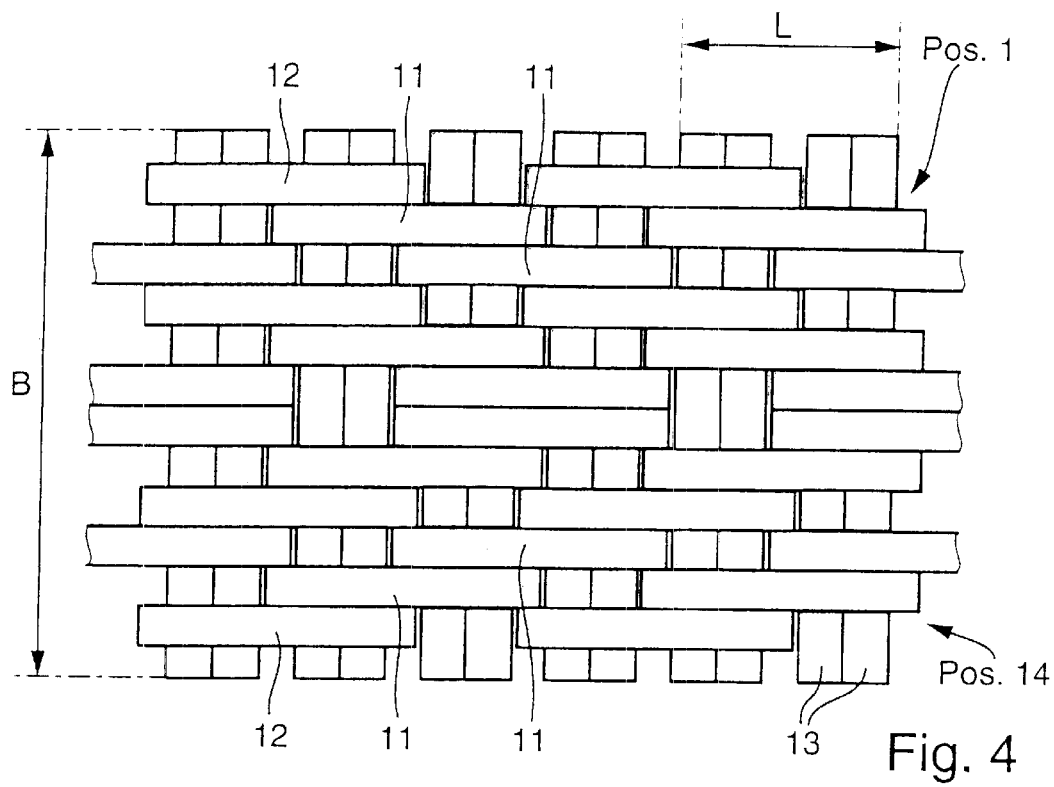
FIG. 4 is a top view corresponding with FIG. 3 and showing a triple plate-link connection of the known plate-link chain shown in FIG. 2.

It can be seen from the top view of FIG. 4 how known chains can be constructed as triple-link units. Here can be seen over the width of the chain the standard plate links 11 and the outer plate links 12 that are set against each other in each case and separated in the direction of chain movement, whereby on the other hand, however, the spacing between links assembled by pairs of rocker members 13 can be reduced compared with the double-link unit in accordance with FIG. 3.

Figure 2:
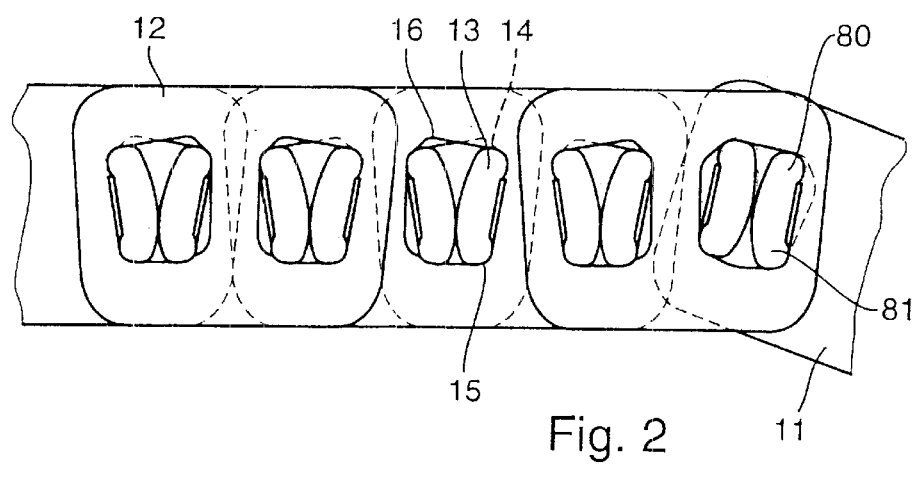
FIG. 2 is a side view of another structure of a known plate-link chain.

The top view of FIG. 4 corresponds with another known chain construction, shown in a side view in FIG. 2, having standard plate links 11 and outer plate links 12, whereby the articulation members are composed of pairs of rocker members 13. These rocker members 13 are shaped in such a way that they only lie against the plate link openings 16 at two positions 14 and 15. Between the contact positions 14 and 15 the rocker members 13 are free of the plate links 11, 12 of the chain.

Figure 5:
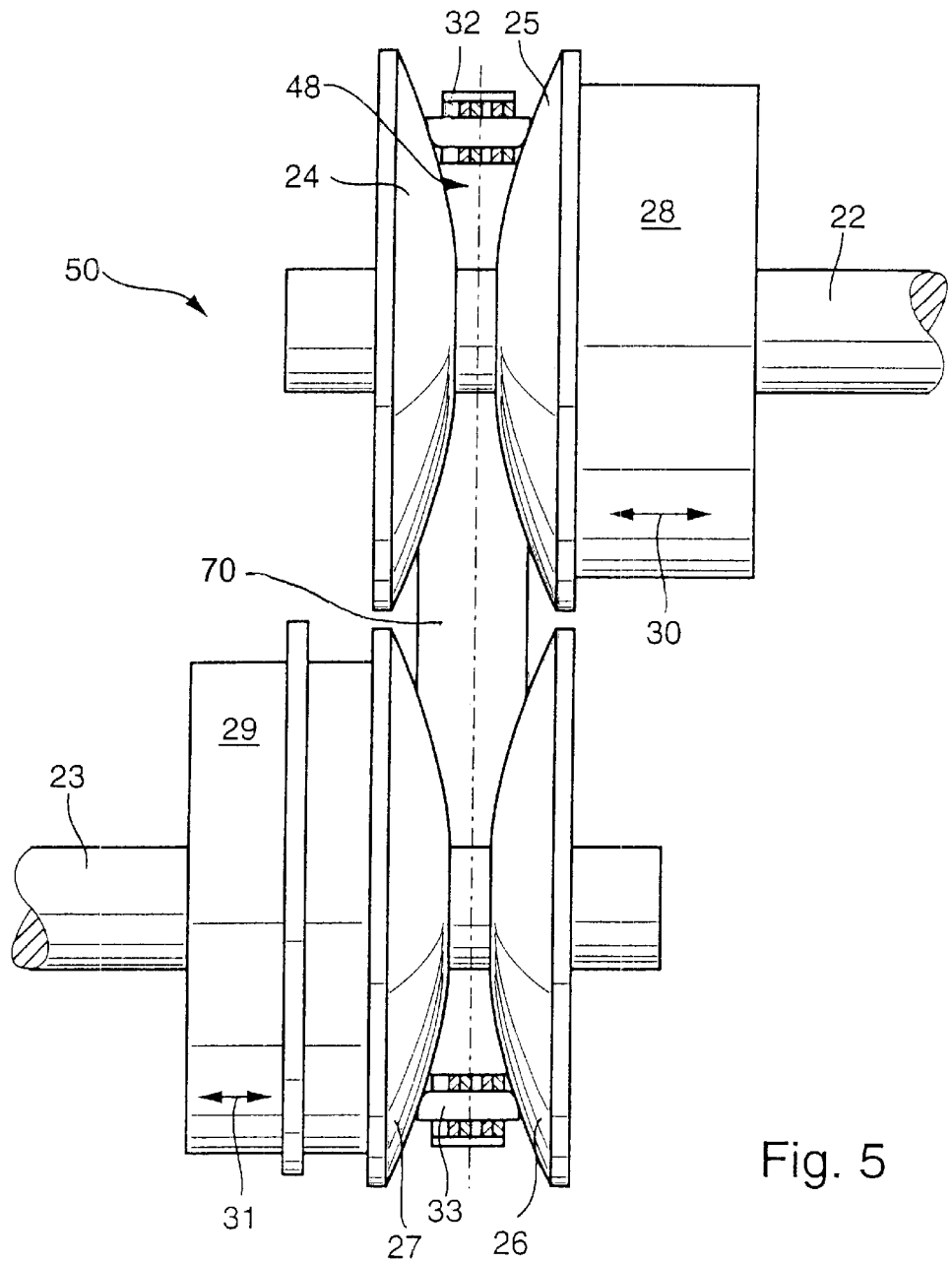
FIG. 5 is a schematic representation of an apparatus for stretching a plate-link chain.

FIG. 5 shows an arrangement 50 to stretch a plate-link chain 32 in accordance with the invention, whereby the plate-link chain 32 is received in a conical disk gap 48 between two sets of conical disks. The arrangement of FIG. 5 can, however, also act as a loop-driven conical pulley transmission, which in operation includes a chain in accordance with the invention. One set of conical disks is formed by the two conical disks 24 and 25 that are axially displaceable relative to each other. The one conical disk 25 is axially movable, see arrow 30. The adjusting cylinder 28 serves to axially displace the chain and to press it against the set of conical disks.

The other set of conical disks is formed from the two conical disks 26 and 27 that are axially displaceable relative to each other. For that purpose one conical disk 27 can be shifted axially, see arrow 31. The adjusting cylinder 29 serves to axially displace the chain and to press it against the set of conical disks. The rotational speed and/or the torque can be adjusted by the input side shaft 22 and the output side shaft 23.

According to another embodiment of an apparatus for stretching a plate-link chain, it can be advantageous for the axes or shafts of the apparatus to be pulled away from each other by the application of a force, so that the plate-link chain is forced into the conical-disk gap and so the power transmission between the plate-link chain and the conical disks can be set at the desired value. In addition, it is not absolutely necessary that the conical disks of the pairs of conical disks be axially displaceable relative to each other. It can also be suitable that the conical disks are rigidly affixed to each other.

When stretching the chain in the loop direction after assembly, the individual links of the plate-link chain will be tight against the rocker members. Thereafter it will be placed in a variable speed unit, for example in accordance with FIG. 5. The chain is stretched in the loop direction by the compression between the rocker members and the conical disks and/or by torque transmission and/or by application of a spreading force. In addition, there will be set a multiple of the pressing forces and torques that normally appear in a transmission, and the chain will be allowed, for example, to run through the variable speed unit with fewer revolutions, so that each chain link, such as plate links and rocker members, passes around the variable speed unit at least once or several times. It is advantageous for the chain to be rotated slowly and with fewer revolutions, compared with the conditions in a motor vehicle transmission.

Typically the stretching process can be carried out in the starting gear ratio (underdrive), whereby the torque of the variable speed unit is adjustable within the range of from zero to ten times the nominal torque, that is, the maximum torque that occurs in the transmission. In particular, a torque in the range of approximately three times the maximum moment of the variable speed unit is set. It is also appropriate that the tension in the strand 70 of the chain is larger during the stretching process than during operation of the transmission. Advantageously, the tension is at least twice the maximum tension during normal transmission operation.

The plate-link chain is then rotated at a low rotational speed in the range of about 0.5 revolutions per minute to about 500 revolutions, advantageously from about 10 revolutions per minute to 50 revolutions per minute, over several revolutions or passes. It can be beneficial, depending upon the plate-link chain, to perform 1 to 20 revolutions.

In accordance with the invention, the transmission ratio can also be changed during the stretching process.

In that way the load distribution is set in a manner corresponding substantially with underdrive (starting gear ratio) in the vehicle. During a stretching process, however, another transmission ratio can also be set, such as, for example, an overdrive transmission ratio or a variable transmission ratio. The advantage of the stretching process in the wrap-around member is that the chain is stretched substantially at each bend of the chain that occurs during operation, and as a result the load distribution is similar to the actual load distribution during operation of the transmission.

As a result of the stretching process in the wrap-around member, and/or as a result of the application of a spreading force on the basis of the contact pressure and/or the torque loading of the chain that is loaded in that manner, the rocker members, considered relative to the shaft of the set of disks, are elastically deformed or bent in the radial direction as well as in the circumferential direction. As a result, considered over the width of the chain, the outwardly-disposed plate links are more heavily loaded than the plate links disposed in the middle of the chain. That has the result that the outer plate links or those plate links disposed on the edge are more greatly elongated than the plate links disposed inwardly, and those outer plate links experience a higher degree of stretching than the inner plate links. By the degree of stretching is meant the condition between the loading by stretching and the condition of ultimate load.

Moreover, it can be beneficial for the plate links of one plate-link row which when assembled have the same length, for those plate links to be elongated differently as a function of the width.

Likewise, it can be beneficial for the plate links of one plate-link row when assembled to already exhibit different lengths and plate-link inner widths, respectively, so that the plate links disposed at the edge of the chain exhibit a larger plate-link inner width than the middle plate links. That can be especially appropriate when stretching is not of the loop member, but, on the contrary, the plate links are stretched before assembly and the plate links are thereafter assembled together to form a chain. Then one can, on the basis of the assembly of the plate links having different plate-link inner widths, construct a chain that already has at its edges longer plate-link inner widths than in the middle. That is shown in exemplary form in FIG. 12. There it is shown that the plate-link inner width as a function of the position of the plate links is greater at the edge than in the middle. That can result both from the stretching process in the loop member as well as from the assembly of different length plate links in accordance with the invention.

Additionally, the plate links that are stretched by a stretching process before assembly can be stretched with different degrees of stretch, and during assembly they can be constructed in such a way that the plate links with a higher degree of stretching are arranged at the edge of the chain. That has the result that the outer plate links or those plate links arranged at the edge are more highly plasticized and loaded than the inwardly-arranged plate links, and those outer plate links experience a higher degree of stretch than the inner plate links. That is shown in exemplary form in FIG. 11. There it is shown that the degree of stretching as a function of plate link position is greater at the edges than in the middle area. That can result both through the stretching process of the loop member and also through the assembly of various highly-stretched plate links in accordance with the invention.

Figure 6:
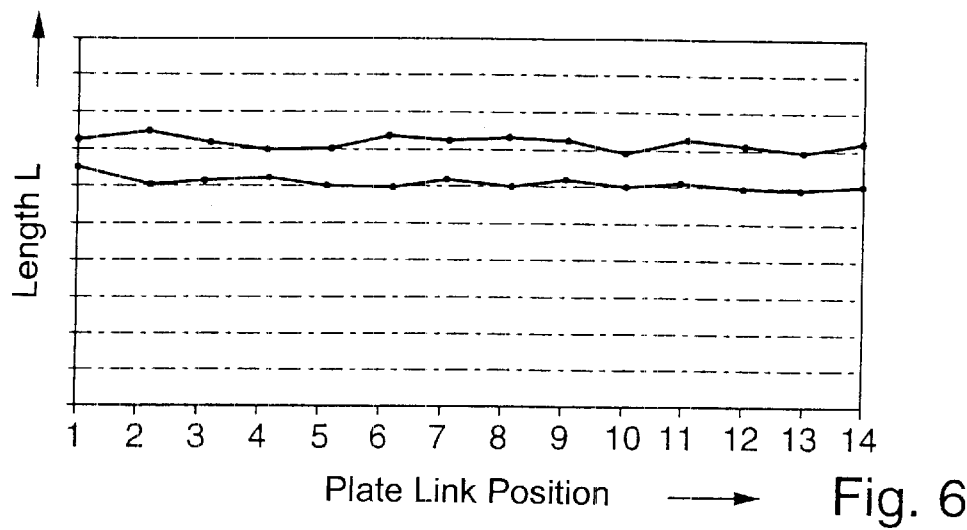
FIG. 6 is a graph showing relative plate-link length as a function of width-wise position of the links for an unstretched chain.
Figure 7:
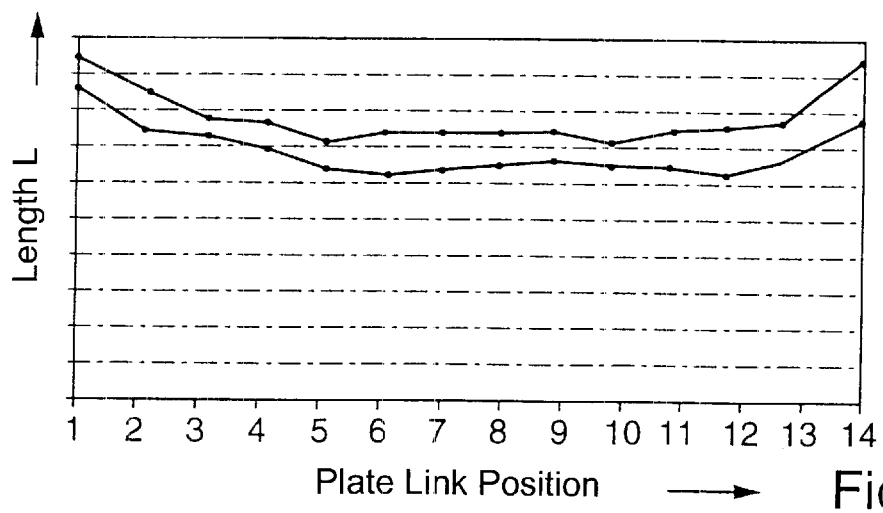
FIG. 7 is a graph showing relative plate-link length as a function of width-wise position of the links after stretching of a chain.
Figure 8:
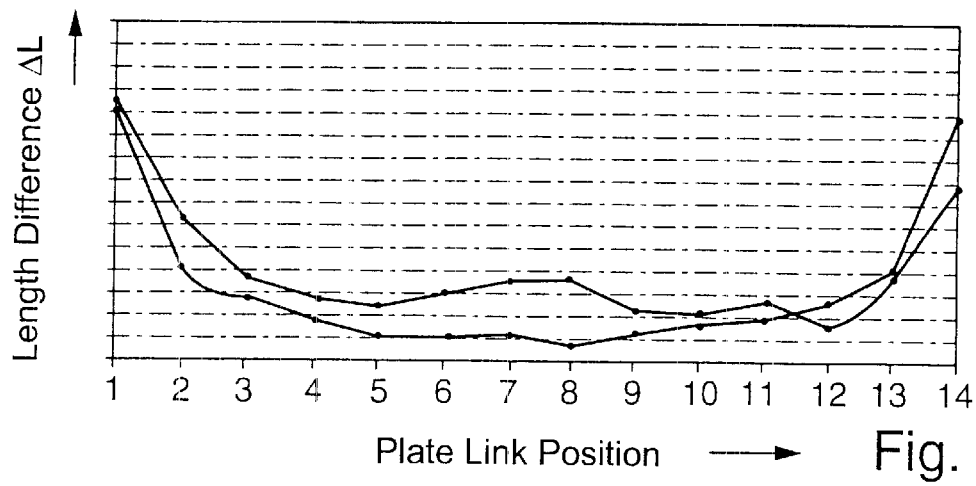
FIG. 8 is a graph showing relative change of plate-link length as a function of width-wise position of the links for a dynamically stretched chain.

FIGS. 6 through 8 show in graphs the condition of the lengths of the plate links considered as a function of their disposition across the width of the chain. On the y-axes of FIGS. 6 and 7 are shown the lengths of the plate links and the length of the spacing L between both contact areas of one plate link, respectively. The length L also represents the plate-link inner width. In FIG. 8 is shown the length difference ΔL of the plate links between an unstretched and a stretched condition in accordance with the invention. Shown along the x-axes of each of FIGS. 6 through 8 is the position of the plate links across the width of the chain. Position 1 corresponds with the position of the plate link on one side of the chain and position 14 corresponds with the position of the plate link on the other side of the chain. Positions 2 through 13 correspond with the plate link positions between the edge plate links 1 and 14. Thereby there is shown specifically a chain with 14 plate link positions across the width of the chain as an illustrative embodiment, though other chain variations can also be included without restrictions on generality.

FIG. 6 shows a graph of an unstretched chain or a stretched open chain in straight condition. The length L as a function of the plate link position 1 through 14 is substantially equal and constant.

FIG. 7 is a graph of a chain that has been dynamically stretched in the wrap-around, closed condition. The length L variation is a function of the plate link position 1 through 14, whereby the edge plate links in positions 1 through 3 and 12 through 14 are more highly stretched than the plate links at the middle plate link positions 4 through 11. That result is based on the radial and circumferential bending of the rocker members and the corresponding high plastic deformation of the contact areas of plate links that are disposed at positions at the edge or near the edge.

FIG. 8 is a graph of a chain that has been dynamically stretched in the wrap-around, closed condition. The length difference ΔL variation is a function of the plate link positions 1 through 14, whereby the edge plate links in positions 1 through 3 and 12 through 14 are more highly stretched than the plate links at the middle plate link positions 4 through 11. That result is based on the radial and circumferential bending of the rocker members and the corresponding plastic deformation of the contact areas of plate links that are disposed at the edge or near the edge. The presentation in FIG. 8 clearly illustrates once again the inventive effect to increase the efficiency of the chain.

The small fluctuations in the length L, that is, in the elongation ΔL in the middle area results from measurement errors.

The elongation of the plate links during the stretching process produces a plastic deformation of the plate links in the contact areas between the plate links and the rocker members.

Through the particularly radially- and/or circumferentially-directed bending of the rocker members there results a plate link plastic deformation, which accommodates the angle between the movement direction and the rocker member.

Figure 9:
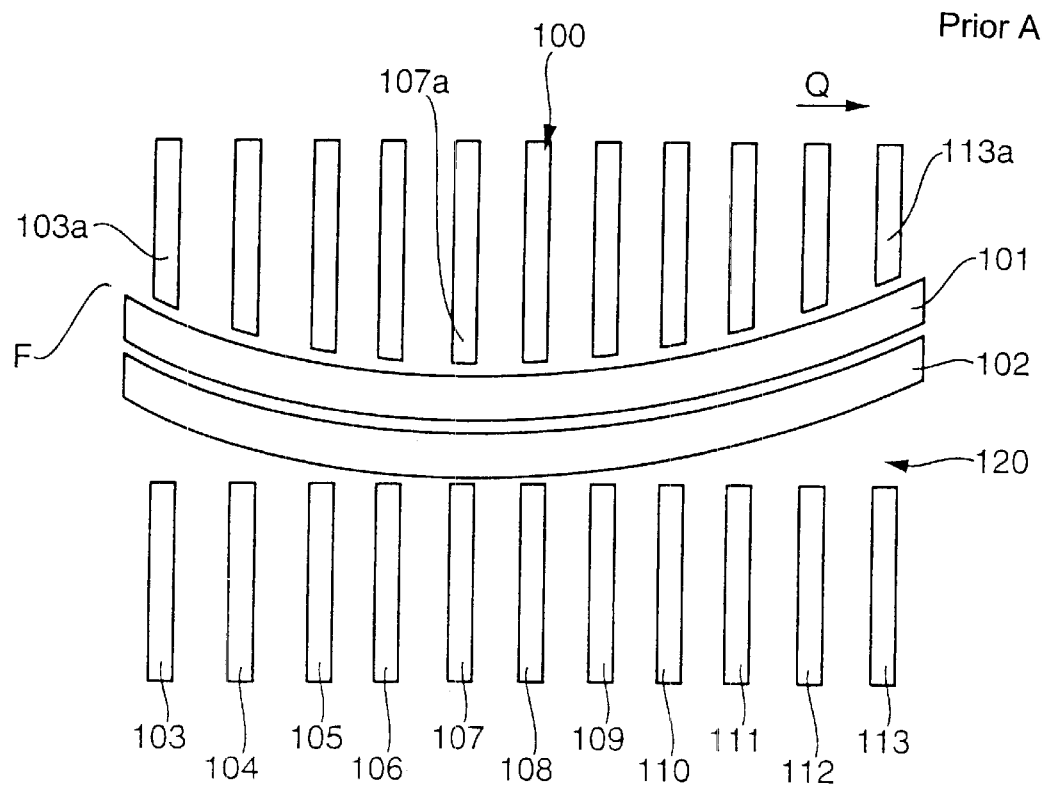
FIG. 9 is a representation of the extension of plate-links.

FIG. 9 shows a section of a chain 100 with rocker members 101 and 102, which are received in openings 120 of the plate links 103 through 113. The rocker members are represented as bent in the manner that they can be bent in a dynamic stretching process in the wrap-around mode, such as, for example, in the disk wedge. The representation is for clarification and is of course a somewhat exaggerated representation.

The contact areas 103a through 113a are plastically deformed by the bending of the rocker members 101 and 102 and match their contour with that of the rocker members. It is shown that the outer plate links are more severely elongated and the plastic deformation leads to a larger angle α between the chain transverse direction Q and the contact surface F than at a middle plate link such as, for example, 107. FIG. 9a and FIG. 9b each show a cutaway portion.

The angle α increases moving from the middle of the chain to the outside.

FIG. 10 shows a graph in which the angle α is shown as the value |α| represented as a function of the plate link position. The angle increases outwardly toward the edges and returns to zero at the middle area. That can be achieved in accordance with the invention by stretching the loop member or, suitably by a further object of the invention, also by stretching the plate links in such a way before assembly, in which they are stretched to different angles α and are subsequently mounted together to a chain.

Figure 11:
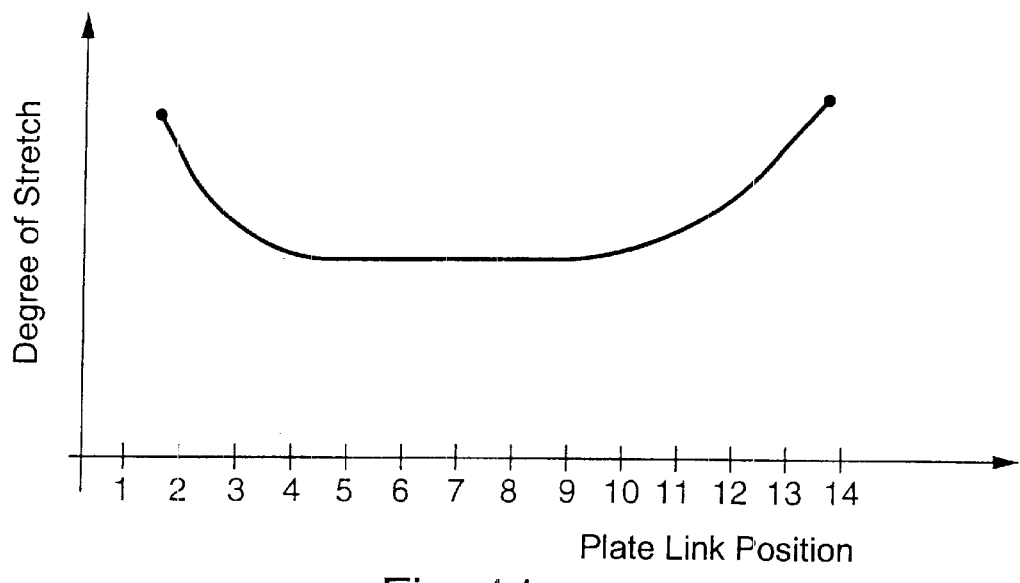
FIG. 11 is a graph of degree of stretch as a function of width-wise position of the plate links.
Figure 12:
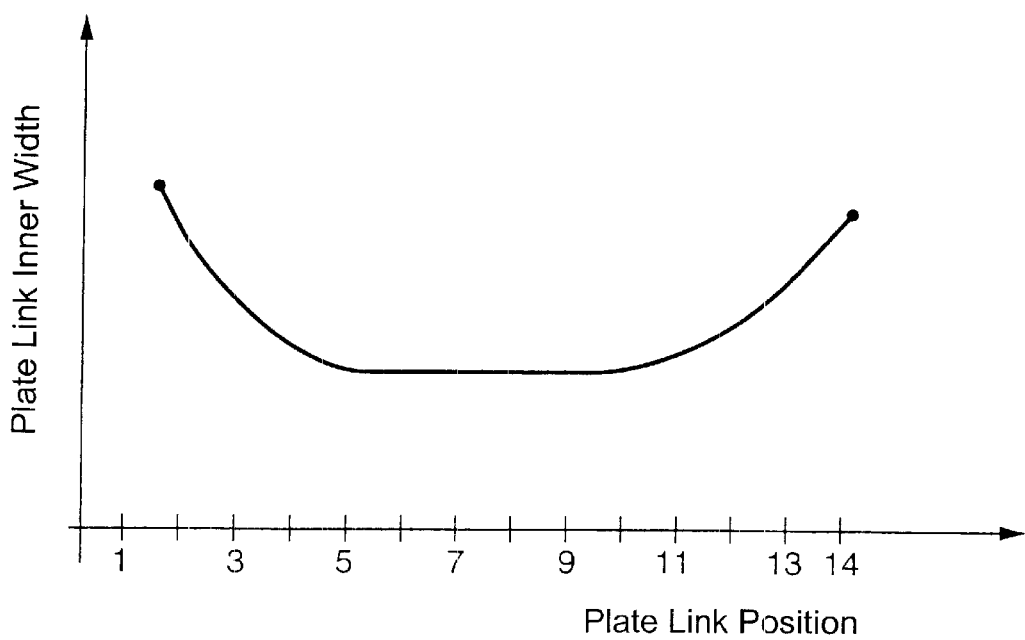
FIG. 12 is a graph of plate-link inner width as a function of width-wise position of the plate links.

FIGS. 11 and 12 show the degree of stretch of the plate links, and the plate-link inner width, respectively, as a function of width-wise plate-link position.

The plate links near the edge are more highly loaded by the stretching in accordance with the invention than by a stretching process on a straight strand. Thereby the plate links at the edge are more highly elongated and the degree of stretch is higher.

Through the proper stretch loading of the chain by the stretching process the chain will be preconditioned in such way that during later operation of the chain in a transmission the loading will be equalized and the chain will therefore experience a longer service life.

Furthermore it is advantageous, for thereby reducing the loading on the chain, that the force introduction by the rocker members to the link elements, by a two-area contact 80, 81 in conformance with FIG. 2, be equalized in both areas. Regarding that, reference is particularly made to German patent application DE 30 27 834, the contents of the disclosure of which expressly forms part of the content of the foregoing application.

Figure 13:
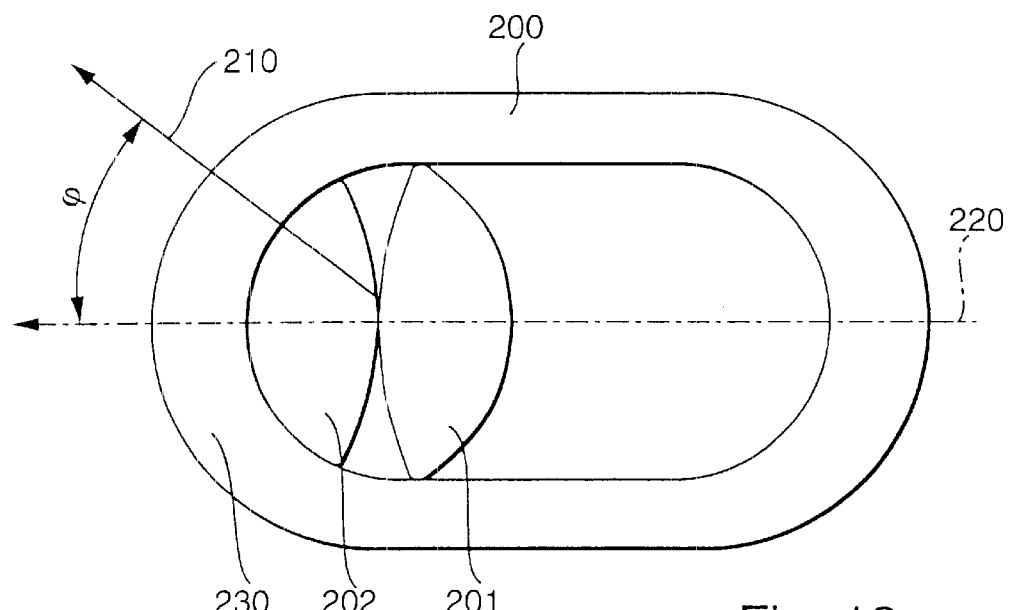
FIG. 13 is a view of a plate link.

FIG. 13 shows a detail of a plate link 200 with rocker members 201 and 202, wherein the plate link is stretched in such a way by a stretching process that the force introduction of the stretching force 210 is oriented at an angle Φ to the plate link, that is, to the chain length direction 220. During a stretching operation the angle Φ will be varied so that it extends from about 60 degrees to about −60 degrees, so that the contact areas 230 will be stretched and plastically deformed over a wide angular range. Those plate links are also individually preconditioned.

Figure 14:
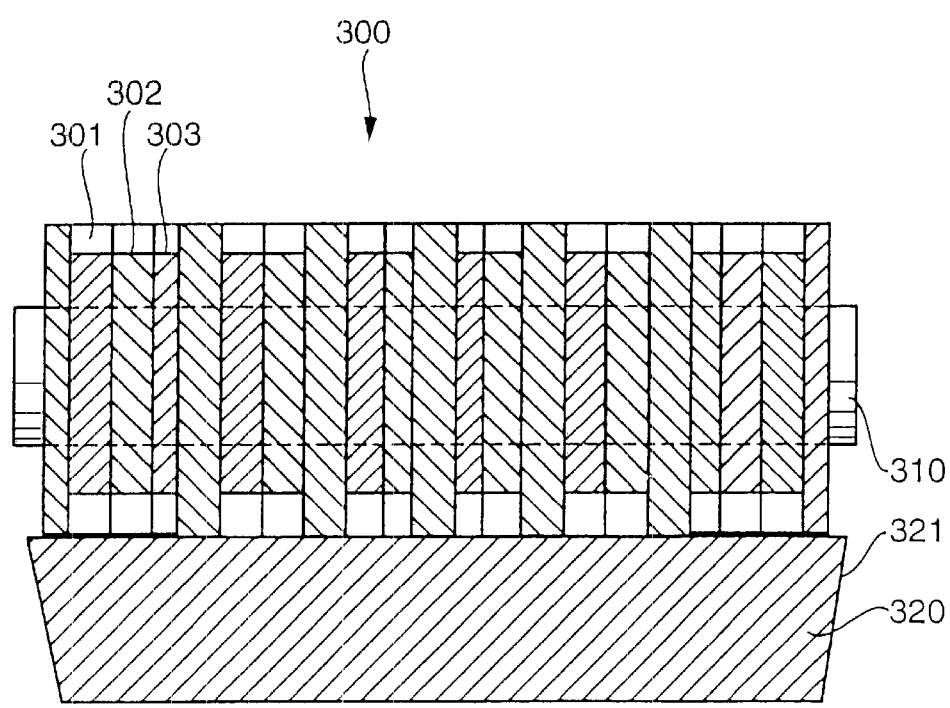
FIG. 14 is a plate-link chain in section.

FIG. 14 shows a plate-link chain 300 in section, in which next to the plate links 301, 302, 303 and the rocker members 310 there exist cross pins 320 as a hinge for torque transmission between the conical disks and the chain. The frictional force transmission results from the end faces 321 of the cross-pins.

It is especially advantageous if the chain is constructed symmetrically, viewed in a lengthwise direction. In this case, symmetrical means that the plate links are arranged equally to the right and to the left of an imaginary centerline of the chain, and thereby the chain is symmetrical in terms of that imaginary centerline. The centerline can be formed by way of a row of plate links or by two symmetrical rows of plate links, so that together there results an even numbered number of plate-link rows or an odd number of plate-link rows. Thereby a uniform elongation of the outer plate links is achieved, and the moment transfer capacity is increased.

Figure 15:
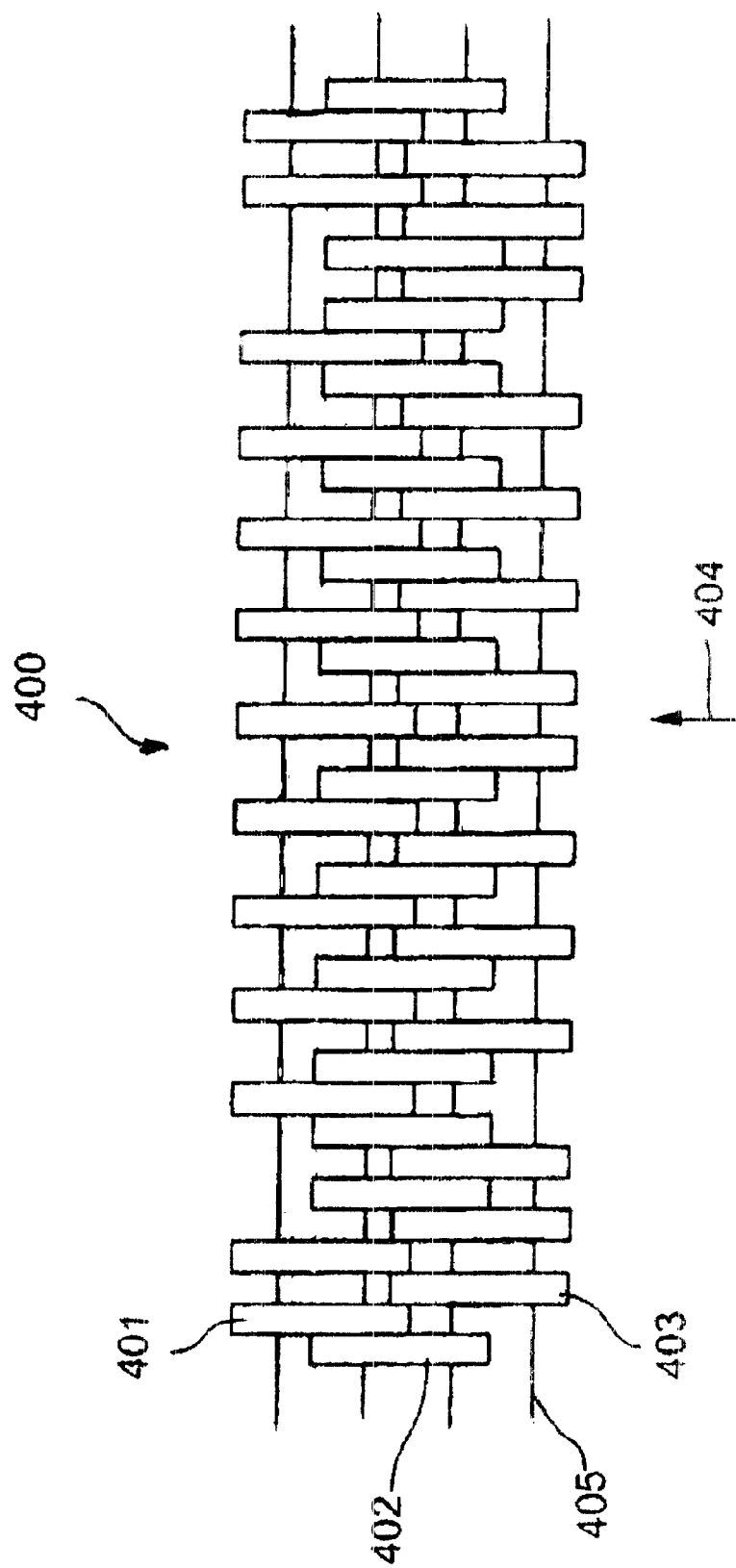
FIG. 15 is a portion of another chain structure.

FIG. 15 shows a section of a plate-link chain 400 in accordance with the invention having a symmetrical construction. The transmission pins 405 are indicated as lines. Only three rows of plate links of the chain are shown in order to illustrate the principle of a symmetrical chain. The plate links 401, 402 and 403 are arranged symmetrically relative to the arrow 404, wherein the arrow 404 represents the chain movement direction. It is also possible for individual plate links to be formed as double plate links or as reinforced plate links, to be able to meet the increased load.

The claims included in the application are exemplary and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A plate-link chain for a continuously variable transmission of a motor vehicle, said chain comprising:
   a) a plurality of interconnected, side-by-side plate links and end-to-end plate links, wherein the end-to-end plate links are spaced from each other a predetermined distance, each plate link including a plate-link opening that is at least partially aligned with a corresponding plate-link opening in an adjacent plate link to define a passageway for receiving a transversely-extending plate-link connecting element;
   b) a plurality of plate-link connecting elements in the form of elongated rocker members that each have longitudinal axes that extend within the plate-link openings of each of at least one pair of side-by-side plate links, the rocker members disposed in pairs of opposed, parallel rocker members, wherein the respective rocker members of a pair of rocker members each include opposed, convex rocker surfaces that are in contact with each other to allow relative rocking movement between the contacting rocker members as the chain passes around a drive member associated with the transmission, and wherein the plate links and rocker members define a closed loop chain that has a symmetrical plate-link disposition relative to a longitudinal centerline of the closed loop chain; and
   c) wherein the closed loon chain is preliminarily stretched before installation of the chain in a continuously variable transmission by imposing a tensile force on the chain while it is in a closed loop, and wherein as a result of the preliminary stretching of the closed loop chain the plate-link openings have opposed surfaces that are contacted by the rocker members and that define an acute angle relative to a chain transverse axis.

2. A plate-link chain in accordance with claim 1, wherein the chain includes a plurality of inner triple link units on opposite sides of the chain longitudinal centerline, and wherein the triple link units are progressively offset from each other in a longitudinal direction of the chain to define a chevron pattern that is symmetrical with the chain longitudinal centerline and in which apices of the chevron pattern, point in a direction opposite from a chain movement direction.

3. A plate-link chain in accordance with claim 2, including a plurality of triple link units outwardly adjacent to the inner triple link units and having links progressively offset from each other in a longitudinal direction of the chain to define a chevron pattern symmetrical to the chain longitudinal centerline and extending opposite to the chevron pattern of the inner triple link units.

4. A plate-link chain in accordance with claim 1, wherein the plate links have different plate-link opening inner widths as a function of the width of the chain.

5. A plate-link chain in accordance with claim 4, wherein plate-link opening inner contact surfaces of adjacent side-by-side plate links have different contact surface inclination angles relative to a chain transverse axis.

6. A plate-link chain in accordance with claim 5, wherein the plat links are longitudinally stretched during the chain stretching process.

7. A plate-link chain in accordance with claim 6, wherein plate links adjacent to an outer edge of the chain are stretched to a higher degree than are plate links adjacent to the centerline of the chain.

8. A plate-link chain in accordance with claim 5, wherein plate-link inner surfaces of adjacent side-by-side plate links define a curve across the chain width.

9. A plate-link chain in accordance with claim 8, wherein the curve has the shape of a polynomial of the $n^{th}$ degree.

10. A method for increasing the load-carrying capacity of plate links of a plate-link chain for a power transmission system, said method comprising the steps of:
   a) forming a plate link having a pair of oppositely-facing side surfaces and an opening that passes through the side surfaces and that has an initial inner width in a longitudinal direction of the plate link;

b) applying a stretching force to the plate link to enlarge the plate-link inner width by deforming the oppositely-facing side surfaces; and c) assembling a plurality of stretched links together to form a closed loon drive chain.

11. A method in accordance with claim 10, including the step of deforming the oppositely-facing side surfaces so that the side surfaces are at an acute angle relative to a plane passing transversely through the plate link.

12. A method in accordance with claim 11, wherein the plate-link side surfaces of adjacent side-by-side plate links define a curve across the chain width.

13. A method in accordance with claim 12, wherein the curve has the shape of a polynomial of the $n^{th}$ degree.

* * * * *

UNITED STATES PATENT AND TRADEMARK OFFICE
CERTIFICATE OF CORRECTION

PATENT NO. : 6,676,552 B2
DATED : January 13, 2004
INVENTOR(S) : Klaus Scheufele and Werner Gruca It is certified that error appears in the above-identified patent and that said Letters Patent is hereby corrected as shown below:

Column 10,
Line 20, "loon" should read -- loop --; and

Column 11,
Line 7, "loon" should read -- loop --.

Signed and Sealed this

Twenty-third Day of March, 2004

JON W. DUDAS
*Acting Director of the United States Patent and Trademark Office*